United States Patent Office 2,723,981
Patented Nov. 15, 1955

2,723,981

PROCESS OF PRODUCING PHTHALOCYANINE PIGMENTS

Volney Tullsen, Westfield, N. J., assignor to American Cyanamid Company, New York, N. Y., a corporation of Maine No Drawing. Application October 17, 1951,
Serial No. 251,812

1 Claim. (Cl. 260—314.5)

This invention relates to the preparation of improved halogen-free metal phthalocyanine pigments, and more particularly to an improved process for finishing halogen-free metal phthalocyanine pigments in a finely-divided form exhibiting high tinctorial strength and tinctorial stability in paint, enamel and lacquer systems containing aromatic solvents.

Paints, enamels, lacquers, printing inks and the like contain as the liquid vehicle hydrocarbon solvents such as benzene, xylene, toluene, solvent naphtha and the like. Halogen-free metal phthalocyanine pigments used in these coating compositions are known to have an objectionable tendency toward crystal growth when brought in contact with these aromatic solvents. Crystal growth is objectionable because it destroys the tinctorial value of the coating composition.

The problem of crystal growth was solved by Wiswall as disclosed in United States Patent No. 2,486,351. In accordance with the Wiswall process, the phthalocyanine is first transformed into a coarse crystal form with large particle size by inducing crystal growth in a crystallizing liquid such as xylene or toluene. These coarse crystals are then ground with a dry grinding aid. The finely-ground material which has an average particle size well under one micron is stabilized by subjecting the ground crystalline material to the action of an organic crystallizing liquid. The fine crystals are thereby converted into particles of pigment dimension in the alpha crystal form. The pigment particles are stable to crystal growth in the solvents used in paint and printing ink vehicles.

The terminology used herein in referring to the alpha and beta crystal forms of phthalocyanine blue is in accordance with the nomenclature used by R. H. Kienle in Official Digest, Federation of Paint and Varnish Production Clubs, No. 300, page 48, January 1950.

Loukomsky, as disclosed in United States Patent No. 2,486,304, improved upon the Wiswall process by combining in a single treatment the several steps employed by Wiswall. In the Loukomsky process, the phthalocyanine pigment, grinding aid and a small amount of the crystallizing liquid are subjected to an intensive mixing operation, followed by mixing the ground pigment with a larger amount of the same liquid, whereupon transformation to finely-divided solvent stable crystals is effected. In the Loukomsky process, transformation of crystal form and fine division of the pigment occur simultaneously and the resultant pigment has the same desirable crystallizing organic liquid stable characteristics as the product produced by Wiswall.

The Wiswall and Loukomsky patents represented significant advances in the art and permitted the art to use successfully for the first time halogen-free metal phthalocyanine pigments in paints, enamels, lacquers, inks and other coating compositions which could be stored for long periods of time without any change in crystal size of the pigment and, consequently, no diminishing of the tinctorial value of the coating composition.

In spite of the many advantages of the aforementioned processes, however, they have one drawback and that is that the crystallizing liquids used therein must be steam stripped from the pigment mass and this steam stripping operation causes a lowering of the color value of the pigment by frequently as much as 20%.

The present invention is directed to an improvement on the Wiswall and Loukomsky patents referred to in which crystallizing liquids are used that need not be steam stripped from the pigment mass.

It has been discovered by the use of the novel crystallizing liquids forming the subject matter of the present invention that there is no sharp drop in color strength of the finished pigment when such liquids are removed from the pigment mass, and, in fact, the surprising result is obtained that the finished pigment when tested for strength in the usual manner by being ground in lithographic varnish has about a 25% stronger color value than the products heretofore available.

Essentially, the process of this invention comprises subjecting a halogen-free metal phthalocyanine, a solid grinding aid, and one of the novel crystallizing liquids described more fully hereinafter to an intensive mixing and grinding operation. After grinding for the required length of time, the crystallizing organic liquid is extracted by a liquid that is miscible with the crystallizing liquid but is a non-solvent for the pigment, and the pigment is thereafter filtered, washed and air-dried. The finished pigment shows no appreciable loss in tinctorial value and as compared with the prior art products has a color value which is about 25% stronger. The product has excellent can stability and when made up in commercial paint formulation may be stored for prolonged periods without any substantial change in tinting strength.

It is an advantage of this invention that a single grinding treatment in the presence of the novel crystallizing organic liquids is all that is necessary, and thus the multi-stage operations of the prior art involving either exposing the phthalocyanine to a crystallizing liquid, grinding the crystals and then converting the particles into the stable alpha form, or grinding the crystals with a grinding aid in the presence of a small amount of a crystallizing liquid followed by mixing the ground crystals with an excess of the same liquid are obviated.

It is an advantage of this invention also that by the use of the crystallizing organic liquids as are contemplated herein it no longer is necessary to use the laborious and uneconomical steam stripping operations heretofore necessary and, thus the invention has considerable economic advantage.

In carrying out the present invention, I employ crystallizing organic liquids which can be solubilized and washed out of the pigment mass preferably by the use of an aqueous, alcoholic, dilute acid or a dilute aqueous alkaline medium.

Typical crystallizing organic liquids that can be solubilized by either an acid or alcohol treatment and then washed out with water are the liquid aromatic amines typified by aniline, methylaniline, diethylaniline, cyclohexylamine, o-toluidine, m-toluidine, o-chloroaniline, m-chloroaniline, etc. Liquid aliphatic amines such as ethylamine, diethylamine, triethylamine, propylamine, butylamine, amylamine, methylamylamine, ethylhexylamine, nonylamine, ethlenediamine, trimethylenediamine, and allylamine may also be used.

I may also use certain compounds that can be removed from the pigment mass by the use of water alone. Among such suitable compounds are furfural and the heterocyclic bases of the pyridine series such as pyridine, quinoline, the monomethyl derivatives of pyridine, the dimethylpyridines and the methylethyl pyridines. Liquid monohydric phenols such as o-cresol, m-cresol and p-cresol and which can be solubilized by a dilute aqueous alkaline wash are also useful in this invention.

It is to be observed that the crystallizing organic liquids useful in this invention must possess two important characteristics. The organic liquid must be a crystallizing liquid, that is, it must possess the property of converting the pigment from the unstable to the stable alpha form and it must be capable of being removed from the pigment mass preferably by means of an aqueous, alcoholic, dilute acid or dilute aqueous alkaline wash.

If the amines are employed as the crystallizing liquids, they can be solubilized by treatment with alcohol or by treatment with a suitable acid which forms water-soluble salts with the amines which can be washed out with water. Suitable acids are any of the lower monocarboxylic acids, the chloroacetic acids, the hydroxy acids, saturated or unsaturated higher fatty acids and the dicarboxylic acids. Because of their cheapness and ease of operation, however, I prefer to use mineral acids such as hydrochloric acid and sulfuric acid.

Apart from the choice of crystallizing liquid used, the conditions of grinding are not unduly critical. While the grinding may be carried out in a ball mill, rod mill, or the like, such devices require a large body of liquid, and since such fluid slurries materially increase the length of time the pigment must be ground to obtain maximum tinctorial strength, there is little or no advantage to be gained by their use. Consequently, I prefer to use a lesser quantity of liquid so that a pasty or doughy mass is formed. It is preferred, therefore, to use that type of apparatus which is capable of exerting a shearing action on the relatively stiff pasty material such as a dough mixer or other apparatus capable of exerting an intensive mixing and shearing attrition.

It has been observed that too low a ratio of crystallizing liquid to solid material results in a mass of insufficient density to produce maximum grinding efficiency. When the ratio of liquid to solid material results in a coherent mass of high density, maximum grinding efficiency is obtained. When a solid grinding aid-pigment ratio of 9 to 1 is employed, about 1½ to 2 parts of liquid per part of pigment has been found to give improved results.

During the grinding operation there is a tendency for the product to heat which causes a loss in tinctorial value of the finished pigment as well as a deleterious change in shade. Consequently, I prefer to equip the mixer with a jacket through which a coolant such as water, ice water, brine or the like may be circulated. It has been found that improved results are obtained if a lower temperature grinding, for example, below 40° C., is carried out. With the preferred method of operation the pigment mass remains relatively cool and somewhat friable which contributes to the ease of grinding permitting faster and more efficient grinding of the pigment. In using the preferred procedure, it has been found that maximum tinctorial strength of the product is developed in a much shorter period of time as compared with the prior art methods and usually the maximum strength is developed in from 8 to 12 hours.

I may use as the solid grinding aid any material suitable for this purpose, such as, for example, sodium chloride, calcium carbonate, or finely-divided materials such as diatomaceous earth, blanc fixe, powdered silica, soluble carbohydrates, and the like, and which may be removed if desired after the grinding operation has been completed by means of a suitable washing operation. The particle size of the grinding aid used herein is not unduly critical. However, I have found that excellent results are obtained when using a grinding aid of the particle size described and claimed in the copending application of Thomas D. Mutaffis, Serial No. 251,817, filed concurrently herewith, now Patent No. 2,669,569.

The use of such extremely small particle size grinding aids in the present invention results in a further decrease in the length of time the pigment must be ground to obtain maximum tinctorial strength, the maximum strength usually being developed in a matter of 2 to 4 hours.

The following examples are illustrative of the present invention, all parts being by weight unless otherwise specified.

Example 1

75 pounds of chlorine-free copper phthalocyanine prepared under nitrobenzene by the process disclosed in United States Patent No. 2,317,787 and acid-pasted according to the procedure described therein, 675 pounds of micropulverized salt and 113 pounds of aniline were charged to a dough mixer equipped with a water cooled jacket and mixed for 12 hours. The charge was thereafter drowned in 3600 pounds of water containing 75 pounds of sulfuric acid. The slurry was stirred for one hour, the pigment filtered, washed acid-free and subsequently dried at 80° C. The resulting bright blue pigment had a strong green shade and exhibited a high tinctorial strength. As compared with the best prior art products available, the product had a color value which was about 25% stronger. It was also very much darker in masstone and much more intense in undertone and considerably cleaner in tint. Particle size measurements from electron microscope counts showed that the pigment crystals were 0.12 micron in length and 0.09 micron in width. Surface area measurements by the gas absorption method indicated a surface area of 71.0 square meters per gram indicating an average particle size of 0.06 micron. The product was boiled for one hour in xylene. Particle size measurements from electron microscope counts now showed the pigment crystals to be 0.23 micron in length and 0.15 micron in width. When the pigment was made up in a commercial paint formulation and stored for six months there was no evidence of crystal growth as evidenced by no loss in tinting strength.

Example 2

60 parts on a dry basis of crude chlorine-free copper phthalocyanine prepared as in the preceding example, 550 parts of micro-pulverized salt and 122 parts of aniline were charged to a dough mixer and ground at room temperature for 12 hours. The ground material was then drowned in 4000 parts of water containing 50 parts real hydrogen chloride. The slurry was stirred for one hour, filtered, washed free of acid and air dried at 60° C. The resulting strong green shade pigment had substantially the same properties as the product of Example 1.

Example 3

The crude chlorine-free copper phthalocyanine used in this example was prepared under diethylene glycol by the process disclosed in United States Patent No. 2,318,787. 60 parts of this crude were treated in accordance with the procedure set forth in the preceding example and the resultant product was a strong green shade crystallization resistant pigment having excellent tinctorial value.

Example 4

60 parts on a dry basis of crude chlorine-free copper phthalocyanine prepared under methylcyclohexane by the process disclosed in United States Patent No. 2,318,783 were heated at 80° C. with 122 parts of aniline. The mixture was charged to a dough mixer and 500 parts of micropulverized salt were added. The mixture was ground for 12 hours at room temperature and the ground material was drowned in 4000 parts of water containing 50 parts real hydrogen chloride. The slurry was then stirred for one hour, filtered, washed free of acid and air-dried at 60° C. A good strong green shade pigment having excellent resistance to crystallization was obtained.

Example 5

240 parts of a washed, crude, chlorine-free copper phthalocyanine prepared from phthalic anhydride and urea, 465 parts of aniline and 2000 parts of micropulverized salt were charged to a dough mixer and mixed for 12 hours at room temperature. The ground material was then drowned in 8250 parts of water and 230 parts of hydrogen chloride gas. The slurry was stirred for one hour, filtered, washed free of acid and air-dried at 60° C. A green shade crystallization resistant product having excellent tinctorial value was obtained.

Example 6

The procedure of Example 2 was repeated except that 4000 parts of water containing 60 parts of sulfuric acid were used to solubilize the aniline instead of the hydrogen chloride used in Example 2. The pigment obtained by this treatment was comparable to the product of Example 2.

Example 7

100 parts on a dry basis of chlorine-free copper phthalocyanine prepared under nitrobenzene by the process disclosed in United States Patent No. 2,318,787 and acid-pasted according to the procedure disclosed therein, 164 parts of o-toluidine and 420 parts of microatomized salt having a surface area of 0.45 square meters per gram were charged to a dough mixer and ground for about 6 hours. The ground material was drowned in dilute hydrochloric acid to neutralize the o-toluidine, stirred thoroughly to dissolve the salt and o-toluidine, filtered, washed acid-free and air-dried at 60° C. The pigment when ground with a lithographic varnish and tested for strength in the usual manner was found to be satisfactory.

Example 8

The procedure of the preceding example was repeated except that 170 parts of p-cresol were substituted for the o-toluidine used in Example 7. The material was ground for 20 hours. The p-cresol was solubilized by stirring with dilute sodium hydroxide, the pigment was filtered, washed and air-dried as in the preceding example. A strong green shade pigment having satisfactory brightness was obtained.

Example 9

The procedure of Example 7 was repeated except that 155 parts of pyridine were substituted for the o-toluidine used in Example 7. The mixture was ground as in Example 7 and the pyridine was solubilized and washed out by a water wash. The pigment obtained by this procedure was a green shade, crystallization resistant product having excellent tinctorial value.

Example 10

The procedure of Example 7 was repeated except that 185 parts of furfural were substituted for the o-toluidine used in Example 7. The furfural was solubilized by a water wash and the finished pigment was found to be slightly weaker in tinctorial value than the pigment obtained by following the treatment specified in Example 8, but had excellent brightness.

Example 11

The procedure of Example 7 was repeated except that 160 parts of methylamylamine were substituted for the o-toluidine used in Example 7. The mixture was ground for 20 hours instead of 6 hours as in Example 7. The finished pigment possessed a bright green shade having excellent brightness and tinctorial value.

Example 12

605 parts of acid-pasted chlorine-free copper phthalocyanine, 1210 parts of aniline and 5460 parts of microatomized salt having a surface area of 0.86 square meters per gram were charged to a dough mixer. After 2 to 4 hours grinding, ink rub-outs showed that maximum tinctorial strength had been obtained.

Example 13

220 parts of washed, crude copper phthalocyanine, 950 parts of aniline and 2000 parts of micropulverized salt were added slowly to a mixer equipped with a high speed stirrer. During the charging period the speed of the stirrer was increased slowly. Stirring was continued for 3 hours and 35 minutes. The ground paste was slurried and washed with hydrochloric and sulfuric acid solutions and was thereafter washed acid-free and subsequently air-dried. The air-dried pigment when ground in lithographic varnish had a color value which was about 25% stronger than a prior art product.

Example 14

60 parts of acid-pasted zinc phthalocyanine, 550 parts of micropulverized salt and 122 parts of aniline were charged to a dough mixer and ground at room temperature for 12 hours. The ground material was then drowned in 4000 parts of water containing 50 parts real hydrogen chloride. The slurry was stirred for one hour, filtered, washed free of acid and air-dried at 60° C. A soft very bright blue crystallization resistant pigment was obtained.

Example 15

The procedure of the preceding example was repeated using acid-pasted nickel phthalocyanine. The mixture was ground as in Example 14 and the pigment was thereafter recovered as specified therein. An olive green shade crystallization resistant pigment was obtained.

I claim:

The method of producing a tinctorially strong, halogen-free, copper phthalocyanine pigment in a finely-divided pigmentary state characterized by tinctorial stability in aromatic solvents which comprises subjecting the pigment to a grinding operation with a solid grinding aid in the presence of aniline, the quantity of aniline being about 1½ to 2 parts by weight for each part by weight of the pigment and being sufficient to convert the pigment-grinding aid mixture into a doughy mass, solubilizing the aniline with dilute aqueous acid, and thereafter drying the pigment.

References Cited in the file of this patent

UNITED STATES PATENTS

| | | |
|---|---|---|
| 2,486,304 | Loukomsky | Oct. 25, 1949 |
| 2,556,728 | Graham | June 12, 1951 |
| 2,556,729 | Stallmann | June 12, 1951 |